(12) United States Patent
McCaffrey et al.

(10) Patent No.: US 10,294,166 B2
(45) Date of Patent: May 21, 2019

(54) DENSIFIED POLYMER INFILTRATED AND PYROLYSIS-BASED CMC ARTICLES

(71) Applicant: United Technologies Corporation, Farmington, CT (US)

(72) Inventors: Michael G. McCaffrey, Windsor, CT (US); Douglas M. Berczik, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/022,615

(22) PCT Filed: Sep. 12, 2014

(86) PCT No.: PCT/US2014/055327
§ 371 (c)(1),
(2) Date: Mar. 17, 2016

(87) PCT Pub. No.: WO2015/057326
PCT Pub. Date: Apr. 23, 2015

(65) Prior Publication Data
US 2016/0229757 A1  Aug. 11, 2016

Related U.S. Application Data

(60) Provisional application No. 61/879,745, filed on Sep. 19, 2013.

(51) Int. Cl.
*C04B 35/573* (2006.01)
*C04B 38/06* (2006.01)
(Continued)

(52) U.S. Cl.
CPC .......... *C04B 38/0615* (2013.01); *B05D 3/007* (2013.01); *C04B 35/573* (2013.01);
(Continued)

(58) Field of Classification Search
CPC .................................................. C04B 35/6267
See application file for complete search history.

(56) References Cited

U.S. PATENT DOCUMENTS 5,635,300 A 6/1997 James et al.
6,024,898 A * 2/2000 Steibel ................. C04B 35/806
264/29.1
(Continued)

OTHER PUBLICATIONS

Supplementary European Search Report for European Patent Application No. 14854030.5 dated Apr. 7, 2017.
(Continued)

*Primary Examiner* — Robert A Vetere
(74) *Attorney, Agent, or Firm* — Carlson, Gaskey & Olds, P.C.

(57) ABSTRACT

A method of densifying a CMC article includes the steps of pyrolyzing a CMC article until a desired initial porosity is achieved, coating CMC pores within the CMC article with carbon, pyrolyzing the carbon to form carbon pores, coating the carbon pores with silicon, and heat treating the CMC article to create a silicon carbide filled pore integrated with silicon carbide of the CMC article to densify the CMC article.

18 Claims, 2 Drawing Sheets

(51) Int. Cl.
*C04B 35/80* (2006.01)
*B05D 3/00* (2006.01)
*C04B 41/89* (2006.01)
*C04B 35/626* (2006.01)

(52) U.S. Cl.
CPC ........ C04B 35/6267 (2013.01); C04B 35/806 (2013.01); C04B 41/89 (2013.01); *C04B 2235/3821* (2013.01); *C04B 2235/3826* (2013.01); *C04B 2235/3873* (2013.01); *C04B 2235/428* (2013.01); *C04B 2235/5248* (2013.01); *C04B 2235/5252* (2013.01); *C04B 2235/5256* (2013.01); *C04B 2235/614* (2013.01); *C04B 2235/616* (2013.01)

(56) References Cited

U.S. PATENT DOCUMENTS

| | | | |
|---|---|---|---|
| 6,071,603 A * | 6/2000 | Sakai | C04B 35/80 428/304.4 |
| 6,120,840 A | 9/2000 | Paul et al. | |
| 6,316,048 B1 | 11/2001 | Steibel et al. | |
| 6,723,382 B2 | 4/2004 | Yamaguchi et al. | |
| 7,012,035 B2 | 3/2006 | Muhlratzer | |
| 7,300,621 B2 | 11/2007 | Merrill | |
| 7,306,826 B2 * | 12/2007 | Subramanian | F01D 5/282 427/249.15 |
| 2003/0145934 A1 * | 8/2003 | Tani | C04B 35/571 156/89.11 |
| 2004/0192534 A1 | 9/2004 | Nixon et al. | |
| 2006/0043628 A1 * | 3/2006 | Matsumoto | B32B 18/00 264/137 |
| 2007/0093587 A1 * | 4/2007 | Shen | C01B 31/36 524/443 |
| 2008/0090064 A1 | 4/2008 | James et al. | |
| 2010/0003504 A1 * | 1/2010 | Louchet-Pouillerie | C04B 41/009 428/334 |
| 2011/0071013 A1 | 3/2011 | Newton et al. | |
| 2011/0071014 A1 | 3/2011 | Kmetz et al. | |
| 2013/0011654 A1 * | 1/2013 | Han | C04B 35/571 428/293.4 |
| 2013/0167374 A1 | 7/2013 | Kirby et al. | |
| 2013/0171426 A1 | 7/2013 | De Diego et al. | |
| 2013/0224471 A1 | 8/2013 | Sheedy et al. | |

OTHER PUBLICATIONS

International Preliminary Report on Patentability for PCT Application No. PCT/US2014/055327 dated Mar. 31, 2016.
International Search Report and Written Opinion for International Application No. PCT/US2014/055327 dated May 29, 2015.

* cited by examiner

DENSIFIED POLYMER INFILTRATED AND PYROLYSIS-BASED CMC ARTICLES

CROSS-REFERENCE TO RELATED APPLICATIONS

This application claims priority to U.S. Provisional Application No. 61/879,745, which was filed on Sep. 19, 2013 and is incorporated herein by reference.

BACKGROUND

This disclosure relates to a method of making gas turbine engine components used in the hot section of the engine, including the turbine section.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

The turbine section is subject to high temperatures, which limit the life of the hot section components. Ceramic matrix composite (CMC) components have been proposed for use in the hot section due to their high temperature durability. Polymer infiltrated and pyrolysis (PIP) based CMC articles are characterized by the method used to create the ceramic matrix. A polymer is added to the fibers to create a preform. The polymer is heated, and at high temperatures, the polymer pyrolyzes into a ceramic matrix, such as silicon carbide, silicon nitride, or into a carbon matrix. The resulting matrix shrinks and forms large voids.

Multiple PIP cycles are typically used to reduce the residual porosity. Unfortunately some voids are sealed off, and the resulting infiltration cycles can no longer fill the voids. As a result, typical PIP based CMC have 5-15% residual porosity. PIP based CMCs with high porosity are weak, due to the flaws, and are affected more readily by oxidation and humidity because the dispersed pores allow the rapid ingress of oxygen and water vapor throughout the CMC structure.

SUMMARY

In one exemplary embodiment, a method of densifying a CMC article includes the steps of pyrolyzing a CMC article until a desired initial porosity is achieved, coating CMC pores within the CMC article with carbon, pyrolyzing the carbon to form carbon pores, coating the carbon pores with silicon, and heat treating the CMC article to create a silicon carbide filled pore integrated with silicon carbide of the CMC article to densify the CMC article.

In a further embodiment of the above, the CMC article is pyrolyzed more than once to achieve the initial porosity.

In a further embodiment of any of the above, the CMC article is pyrolyzed less than six times to achieve the initial porosity.

In a further embodiment of any of the above, the CMC article is pyrolyzed at a temperature of 1000-1400° C. to achieve the initial porosity.

In a further embodiment of any of the above, the CMC pore coating step includes infiltrating the CMC pores with a carbon precursor resin.

In a further embodiment of any of the above, the carbon precursor resin includes fillers selected from the group including silicon, silicon carbide, boron carbide and silicon nitride.

In a further embodiment of any of the above, the carbon is pyrolyzed at a temperature of 1000-1800° C.

In a further embodiment of any of the above, the silicon enters the carbon pores by capillary action.

In a further embodiment of any of the above, the densified article is machined to a desired shape.

In a further embodiment of any of the above, a seal coat is applied to the machine shape.

In a further embodiment of any of the above, an environmental bather coating is applied to the seal coating.

In a further embodiment of any of the above, the CMC article is densified by infiltrating the article with a silicon carbide precursor resin.

In a further embodiment of any of the above, the CMC article is pyrolyzed at 1200-1800° C.

In a further embodiment of any of the above, the silicon carbide precursor resin includes a filler that is selected from the group including silicon, silicon carbide, boron carbide and silicon nitride.

In a further embodiment of any of the above, CMC fibers are arranged about a form and a silicon carbide precursor resin is injected into a mold to provide the CMC article.

In a further embodiment of any of the above, the CMC fibers are wrapped about a form.

In a further embodiment of any of the above, the silicon carbide precursor resin includes a filler selected from the group including silicon, silicon carbide, boron carbide and silicon nitride.

In a further embodiment of any of the above, the CMC fibers are provided as a prepreg.

In a further embodiment of any of the above, the CMC article in the mold is heated to a temperature of 100-600° C. and is removed from the mold.

In a further embodiment of any of the above, the CMC article is placed in a fixture and pyrolyzed to a temperature of 1000-1400° C.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
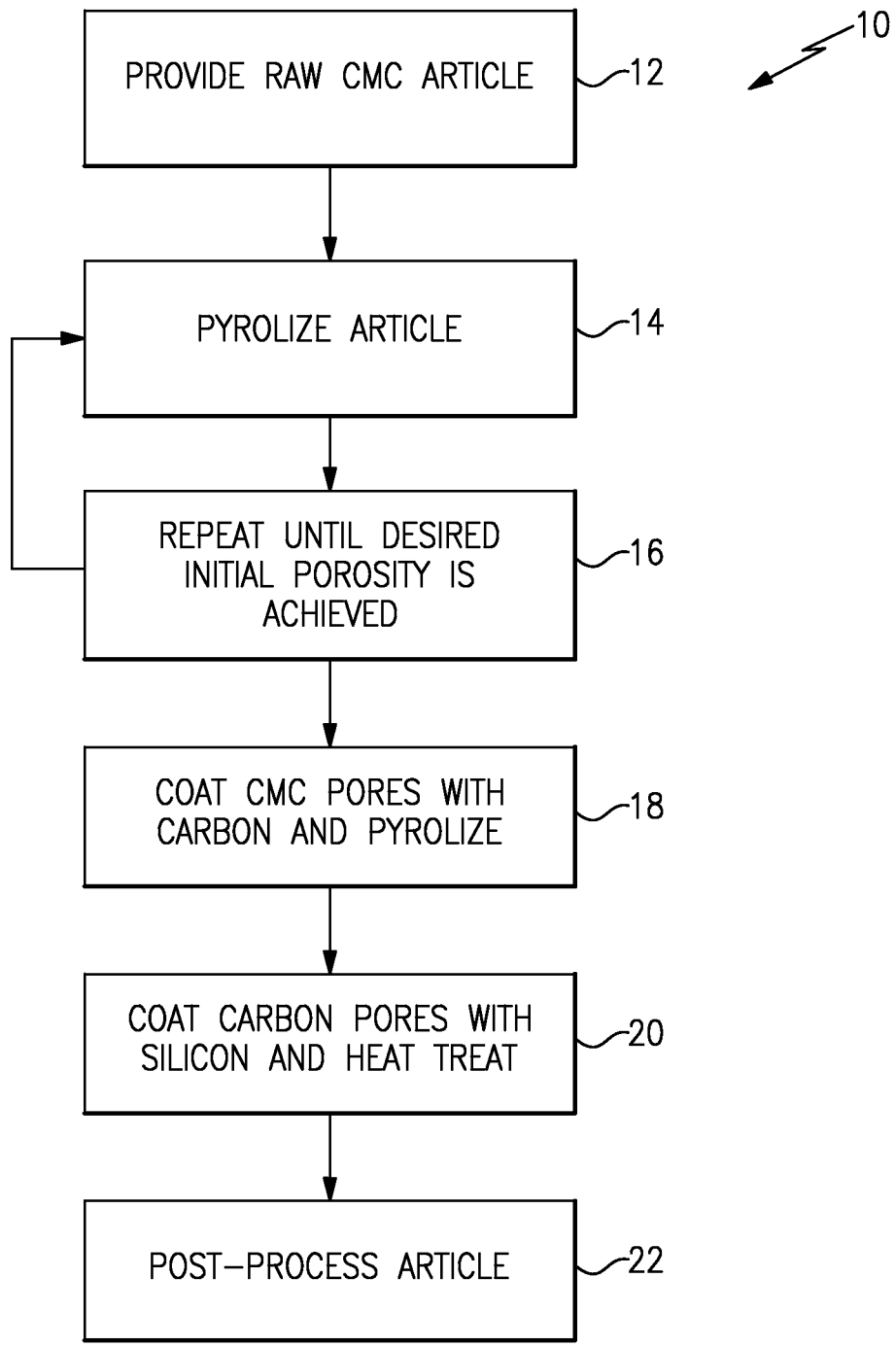
FIG. 1 is a flow chart depicting a method of densifying CMC articles.

A method 10 for densifying a CMC article is illustrated by the flow chart of FIG. 1. A raw CMC article is provided by any number of methods, as indicated at block 12, and heated such that the article is rigid enough to be handled during further processing. The raw CMC article is then pyrolyzed to form a ceramic matrix of, for example, SiC, as indicated at block 14.

Generally, with regard to a silicon carbide CMC (PIP-SiC), the number of resin infiltration-pyrolysis cycles is limited from at least one (1), and typically less than 6, such that a predetermined porosity is reached, as indicated at block 16. This predetermined porosity is between 15% and 40% open porosity and is characterized by large interconnected pores throughout the structure of the CMC article.

Once the desired initial porosity, for example, 5-50%, and in another example, 10-30%, is achieved with sufficient interconnected pores, carbon forming polymer resin is injected and heated to form an open cell foam or coating of carbon on the SiC pores. Further heating then pyrolyzes the carbon into an interconnected network of carbon bubbles or filaments in the PIP derived silicon carbide matrix, as indicated at block 18. Finally, silicon is added to the CMC article, as indicated at block 20, and heated. The silicon is drawn into the carbon bubbles by capillary action, and then reacts with the carbon to form silicon carbide that is integrated with the existing silicon carbide of the CMC article. The resulting PIP derived matrix has a higher density, and greatly reduced porosity, with little or no free-silicon remaining. The CMC article can then be post-processed, as indicated at block 22.

Figure 2:
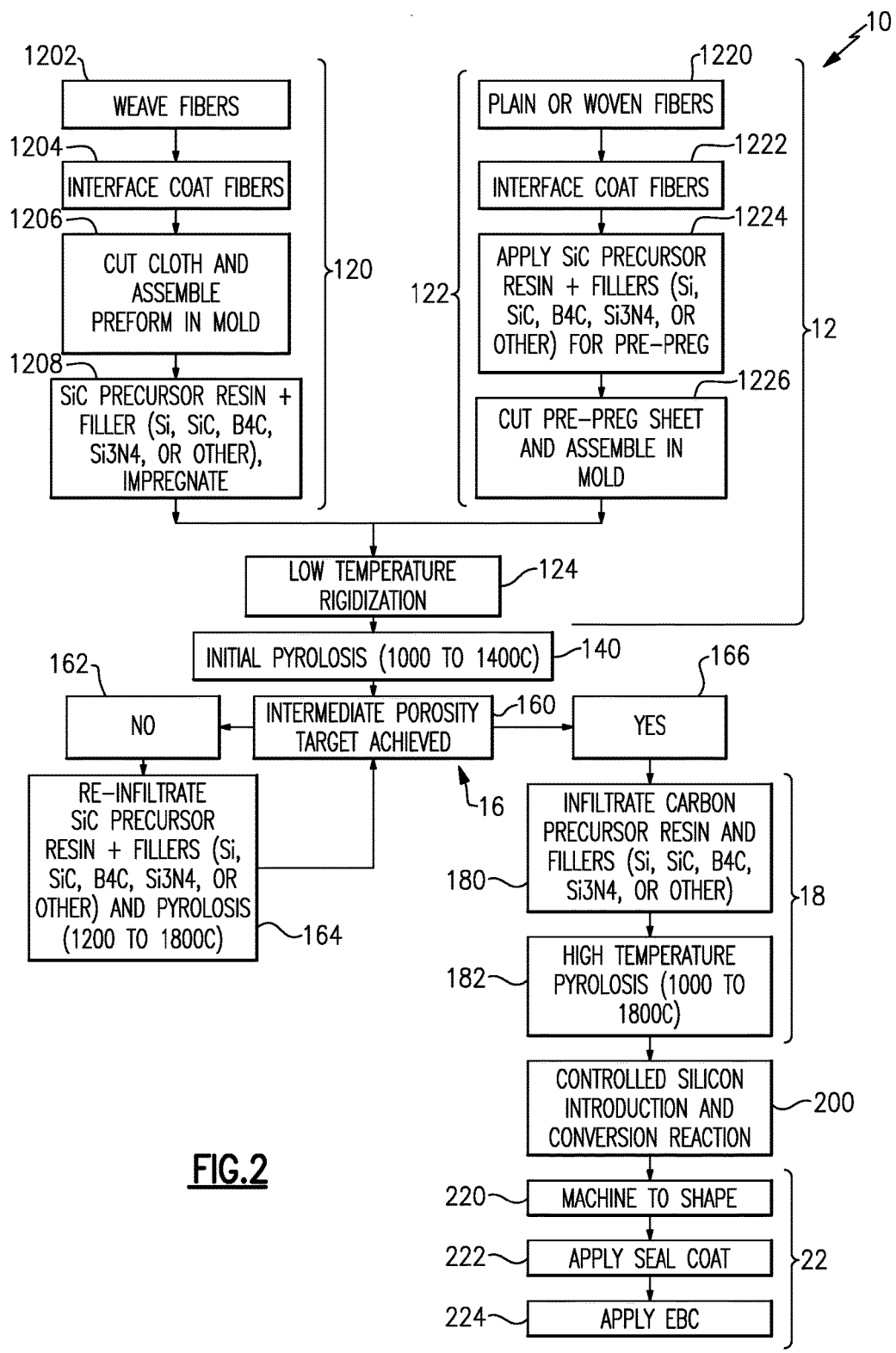
FIG. 2 is an expanded version of the flow chart of FIG. 1.

Referring to FIG. 2, an expanded flow chart is provided that illustrates some of the steps of FIG. 1 in more detail. The raw CMC article may be provided using multiple example processes. In one example, a process 120 includes weaving fibers to provide a fabric, as indicated at block 1202. The fibers are coated as indicated at block 1204. The fiber weave is cut and assembled onto a form, for example, over a mandrel, as indicated at block 1206. A silicon carbide precursor resin is injected into the mold, as indicated at block 1208. The resin may also include filler, such as silicon, silicon carbide, boron carbide ($B_4C$), silicon nitride ($Si_3N_4$) or other filler materials. The silicon carbide precursor and filler impregnates the CMC fabric.

Alternatively, a process 122 may include providing a fiber weave or unidirectional fibers, as indicated at block 1220. The fibers are coated, as indicated at block 1222. The silicon carbide precursor resin and fillers, if desired, are applied to the fibers to provide a prepreg. The prepreg layer is wrapped about a form and placed in a mold, as indicated at block 1226.

The raw article is heated at a relatively low temperature, for example, 100-600° C., to make the CMC article more rigid for subsequent handling, as indicated at block 124. Once the part is sufficiently rigid, the CMC article may be removed from the mold and placed into a fixture, if desired, to maintain the article shape during subsequent heat steps to prevent excessive part distortion as the CMC shrinks. The raw article is pyrolyzed to a temperature of, for example, 1000-1400° C., as indicated at block 140. As a result of the pyrolyzation, the resin and fibers bond to one another and form a ceramic matrix, which includes an undesired amount of porosity. The porosity of the article and its density may be increased by re-infiltrating the article with a silicon carbide precursor resin and, if desired, filler, as indicated in blocks 162, 164.

The article may again be pyrolyzed, for example, to a temperature of 1200-1800° C. to integrate the additional resin and filler into the ceramic matrix, thereby reducing the porosity and increasing the density. This process may be repeated several times, at least one time and typically less than six (6), to densify the CMC article. However, this densification process provides diminishing returns as the process is repeated. Moreover, the pores with the CMC article begin to become noncontiguous and isolated from one another. Thus, once an initial desired porosity is achieved with sufficiently interconnected pores, as indicated at block 166, the CMC article may be infiltrated with a carbon precursor and, if desired, fillers as indicated at block 180. The article is pyrolyzed, for example, to a temperature of 1000-1800° C., to coat the pores of the article, while they are still interconnected, with a carbon layer.

The carbon pores are then infiltrated with silicon and the article heat treated to allow the silicon to react with the carbon, as indicated at block 200. The carbon and silicon react with one another and the existing silicon carbide matrix of the CMC article to integrate with the CMC matrix and further increase the density of the article with little or no free silicon remaining.

The fully densified article may be machined to desired shape, for example, a finish component shape as indicated at block 220. A seal coat, such as a silicon carbide deposition by a chemical vapor deposition CVD process or another PIP process is used to cover fiber exposed from machining, as indicated at block 222. An environmental bather coating may be applied to the exterior surface of the CMC article, as indicated at block 224. Example environmental barrier coatings include barium strontium aluminum silicate (BSAS) or others.

Full densification using PIP cycles alone is not possible. The disclosed method provides a high density, low porosity PIP based CMC article that improves the mechanical properties and increases the environmental resistance, while retaining the advantageous processing methodology of PIP. PIP based CMCs are a lower cost method to create a ceramic matrix verses chemical vapor infiltration (CVI) or CVD. By taking advantage of the open porosity during the densification process, forming carbon bubbles, and reacting silicon with the carbon bubbles, a high quality, fully dense CMC article can be formed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that and other reasons, the following claims should be studied to determine their true scope and content.

What is claimed is:
1. A method of densifying a ceramic matrix composite (CMC) article comprising the steps of:
   pyrolyzing a CMC article having a silicon carbide matrix using a polymer infiltrated and pyrolysis (PIP) process until a desired initial porosity of silicon carbide pores within the silicon carbide matrix is achieved, wherein the CMC article is pyrolyzed at a temperature of 1000-1800° C. to achieve the initial porosity within the silicon carbide matrix;

coating silicon carbide pores within the silicon carbide matrix with carbon;

pyrolyzing the carbon using a PIP process to form carbon pores on the silicon carbide matrix, wherein the carbon is pyrolyzed at a temperature of 1000-1800° C.;

coating the carbon pores with silicon; and heat treating the CMC article to draw the silicon into the carbon pores to react with the carbon and create additional silicon carbide that is integrated with the silicon carbide of the CMC article to densify the CMC article.

2. The method according to claim 1, wherein the CMC article is pyrolyzed more than once to achieve the initial porosity.

3. The method according to claim 2, wherein the CMC article is pyrolyzed less than six times to achieve the initial porosity.

4. The method according to claim 1, wherein the silicon carbide pore coating step includes infiltrating the silicon carbide pores with a carbon precursor resin that provides the carbon.

5. The method according to claim 4, wherein the carbon precursor resin includes fillers selected from the group including silicon, silicon carbide, boron carbide and silicon nitride.

6. The method according to claim 1, wherein the silicon enters the carbon pores by capillary action.

7. The method according to claim 1, wherein the densified article is machined to a desired shape.

8. The method according to claim 7, wherein a seal coat is applied to the machine shape.

9. The method according to claim 8, wherein an environmental barrier coating is applied to the seal coating.

10. The method according to claim 1, wherein the CMC article is densified by infiltrating the article with a silicon carbide precursor resin.

11. The method according to claim 10, wherein the CMC article pyrolyzing step includes pyrolyzing the CMC article at 1200-1800° C.

12. The method according to claim 10, wherein the silicon carbide precursor resin includes a filler selected from the group including silicon, silicon carbide, boron carbide and silicon nitride.

13. The method according to claim 1, wherein CMC fibers are arranged about a form and a silicon carbide precursor resin is injected into a mold to provide the CMC article.

14. The method according to claim 13, wherein the CMC fibers are wrapped about the form.

15. The method according to claim 13, wherein the silicon carbide precursor resin includes a filler selected from the group including silicon, silicon carbide, boron carbide and silicon nitride.

16. The method according to claim 13, wherein the CMC fibers are provided as a prepreg.

17. The method according to claim 13, wherein the CMC article in the mold is heated to a temperature of 100-600° C. and is removed from the mold.

18. The method according to claim 13, wherein the CMC article is placed in a fixture during the CMC article pyrolyzing step to a temperature of 1000-1400° C.

* * * * *